UNITED STATES PATENT OFFICE.

ERNST RICHTER AND ADAM SCHAEFER, OF NEW YORK, N. Y.

METHOD OF PREPARING MALT FOR BREWING.

SPECIFICATION forming part of Letters Patent No. 477,823, dated June 28, 1892.

Application filed December 7, 1891. Serial No. 414,301. (No specimens.)

*To all whom it may concern:*

Be it known that we, ERNST RICHTER and ADAM SCHAEFER, both of New York, in the county and State of New York, have invented a new and useful Improvement in the Method of Preparing Malt for Brewing; and we do hereby declare that the following is a full and exact description thereof.

In the manufacture of beer it is a matter of common knowledge that the wort is liable to be spoiled by the presence in the malt of an excessive amount of germ, which, having done its work, or at least having been an essential product during the sprouting of the grain and the accompanying production of diastase, is not only no longer helpful in the subsequent steps, but is positively deleterious and should be removed as far as possible. Again, the dust which clings to the husks of the malted grains and the flour which is always produced to an excessive amount when the malt is crushed too fine and is produced to a greater or less extent by any degree of crushing will form a paste in the wort and not only prevent the proper access of the water to the less finely-divided particles of grain, but will absorb and retain more or less of the extract, and thus impair the quantity of the beer. Finally, the husks of the malt, which have hitherto been considered necessary, largely on account of the existence of the dust and flour, to permit a thorough permeation of the mass of malt by the water used to extract its desirable qualities and again to permit the extract to run off freely from the mass, not only retain more or less of the starchy particles, but act as a sponge to absorb and hold some of the extract itself, and thus to waste some of the valuable qualities of the malt, notwithstanding the sparging of the malt subsequently to the first drawing off of the extract. All of these admitted evils are necessary consequents of the usual processes employed in the preparation of the malt for the wort and have hitherto been considered unavoidable, though it has been sought by exercising extreme care to make them as small as possible. The utmost that could be done, however, has been to clean the exterior of the husk and to remove that portion of the germ which projects beyond the husk, leaving behind the portion of the germ which is contained within the husk and the husk itself, which when crushed or otherwise broken up makes more or less dust or finely-divided particles of an entirely worthless substance. Furthermore, even if the husks and remaining portion of the germ could be disregarded altogether the usual crushing of the malt necessarily results in the production of more or less flour with its attendant evils.

We have long sought and at length have discovered a way of preparing barley for the wort by which only the valuable portions of the malt are retained and all of the evils above mentioned are obviated, thereby preventing a great deal of waste and materially improving the quality of the beer.

Our invention accordingly consists in the method of preparing barley for the wort, as hereinafter described and claimed.

Commencing with the barley in its natural state we first subject it to the usual steps of steeping, couching, flooring, and drying, which make up the process of malting, by which the germs of the barley are caused to develop and during their growth to produce in the grains the amount of diastase which is essential to the manufacture of malt liquors. The growth of the germ is checked, as usual, by the drying, which is the last step in the process of malting. Hitherto, so far as we are aware, the malt thus produced has been so treated as to remove those portions of the developed germs which project beyond the husks and has then been crushed, husks and all, and put into the mash-tubs; but it is at this point in the treatment of the barley that our process differs from those used heretofore. It is impracticable in the manufacture of malt liquors to remove the husks and germs from the grains in their natural state for the reason before alluded to that the germ must not be disturbed before it has sprouted. We therefore first malt the grain, and then when the requisite change has thus been wrought in its character we remove the husk from the kernels of the malted grain, and in so doing we remove at the same time that portion of the germ which still remains within the husk. This we may accomplish by any suitable means which will effectually remove the husk without breaking down the structure of the kernel. For this purpose we have found that a machine of the general character of an ordinary grain-scourer will serve. The kernels are then thoroughly cleaned and separated from all chaff, germ, and dust by sieves and blowers or other suitable means, thus leaving only that portion of the malt which contains all the valuable matter and leaving it free from all other substances which may have a deleterious effect or may cause waste. Finally the cleaned kernels are more or less finely subdivided in order to expose the whole substance to the action of the water in the wort and secure a more complete extraction of the valuable qualities. This subdivision of the kernels may be effected by any machine which will cut the kernels in contradistinction from crushing or grinding them, the object being to avoid the production of flour or of particles so finely divided as to make paste in the wort. If this operation be conducted properly, it will be found that the liquid of the wort will permeate readily the whole mass of malt and will as readily run off, having extracted substantially all the valuable qualities of the malt and leaving behind no residue, as heretofore, in part to be recovered by subsequent sparging and in part to be thrown away with the husks of the malt.

We are aware that it has been proposed heretofore to prepare maize by first cracking the grains in their natural state to expose the germs and then separating the germs by trituration, and that the product of this treatment is alleged to be well adapted for brewing, as well as for distilling; but it cannot be adapted for the production of malt liquors for the reason that the essential change in the character of the grains which is the object of the malting does not take place. Our method therefore differs in that it includes as an essential part thereof the malting of the grain and in that thereafter it deals with a widely-different article—namely, the malt itself—and treats it in a different way—that is, by first removing the husk and subsequently cutting into small pieces the kernels of the malted grain. Furthermore, we are aware, also, that in the manufacture of flour the wheat grains have been cracked and screened to remove what were considered undesirable particles before grinding and that in the manufacture of oatmeal-grits the grains have been treated to remove the husks and have then been cut into small pieces; but in none of these cases would it have been possible to use the products for the manufacture of malt liquors for the reason that the grains while in a natural state are so treated as to prevent effectually that very action which is essential for our purposes—namely, the malting of the grains before the undesirable parts are separated.

We claim as our invention—

The method of preparing barley for the manufacture of malt liquors, which consists in causing the germs of the grains to develop, drying the grains to check the growth of the germs, removing the husks from the kernels of the malted grains, and removing the germs which were within the husks, separating the kernels from the dust and chaff, and subdividing the kernels by cutting, substantially as shown and described.

In testimony whereof we have signed our names to this specification in the presence of two subscribing witnesses.

ERNST RICHTER.
ADAM SCHAEFER.

Witnesses:
A. N. JESBERA,
A. WIDDER.